United States Patent

[11] 3,607,710

| [72] | Inventors | Gerard M. Farren |
| | | Lombard; |
| | | John J. Staunton, Oak Park, both of Ill. |
| [21] | Appl. No. | 799,385 |
| [22] | Filed | Feb. 14, 1969 |
| [45] | Patented | Sept. 21, 1971 |
| [73] | Assignee | The Perkin-Elmer Corporation |
| | | Norwalk, Conn. |
| | | Continuation-in-part of application Ser. No. 750,305, Aug. 5, 1968, now abandoned. |

[54] SEAL FOR ION-SELECTIVE ELECTRODE
6 Claims, 6 Drawing Figs.

| [52] | U.S. Cl. | 204/195, 204/1 T, 204/291 |
| [51] | Int. Cl. | G01n 27/46 |
| [50] | Field of Search | 204/1.1, 195, 195.1; 136/86, 86 A–86 E, 120 FC, 153 |

[56] References Cited
UNITED STATES PATENTS

| 2,117,596 | 5/1938 | Bender et al | 204/195.1 |
| 3,125,468 | 3/1964 | Thompson et al | 136/86 D |
| 3,334,039 | 8/1967 | Vlasak | 204/195 |
| 3,434,953 | 3/1969 | Porter et al | 204/195.1 |
| 3,442,782 | 5/1969 | Shiller et al | 204/195 |

FOREIGN PATENTS

| 763,082 | 7/1967 | Canada |

Primary Examiner—T. Tung
Attorney—Molinare, Allegretti, Newitt & Witcoff

ABSTRACT: An ion-selective electrode having its ion-transfer membrane sealed about its periphery with an elastomeric material free of fissures, voids and bubbles, thereby providing an electrode which responds almost instantaneously to a change to potential at the test solution-membrane interface. The preferred sealant is a room temperature vulcanizing silicone rubber bonded to the crystal with the aid of a silicone primer. The invention also contemplates a membrane (substitute crystal) made from compacted microsize ion-transfer particles in which each of the tiny particles in the membrane face which contacts the test solution is coated with an elastomeric water impervious film e.g. a room temperature vulcanizing silicone rubber.

Inventors:
Gerard M. Farren
John J. J. Staunton

Inventors:
Gerard M. Farren
John J. Staunton
By Bair, Freeman & Molinare
Attys.

SEAL FOR ION-SELECTIVE ELECTRODE

BACKGROUND OF THE INVENTION

In our copending application, SER. No. 750,305 filed Aug. 5, 1968 now abandoned, of which this application is a continuation-in-part, we disclosed an improved solid connected ion-selective electrode in which the ion transfer crystal was cemented into the recessed end of a hollow nonconducting electrode body by means of an epoxy resin sealant.

That specification disclosed room temperature vulcanizing silicone rubber and polyester resins as substitutes for the epoxy resin sealant. In that invention a connecting wire is attached to the rear or inner surface of the crystal with a solid conductive bonding agent. The resin sealant interposed between the periphery of the crystal and the inside surface of the electrode stem or tube prevents the test solution in which the electrode is immersed from passing around the edge of the crystal and short-circuiting the electrode.

One of the advantages of the solid connection between the conductor and the rear surface of the crystal, as distinguished from the prior solution-connected electrodes, is that the peripheral seal is subject to attack by the liquid electrolyte (salt solution) only when it is in use, that is, immersed in test solution. The solution-connected electrode has liquid electrolyte on the rear surface of the crystal at all times and the seal is therefore continually subject to attack by the electrolyte solution from that side in addition to attack by the test solution when the electrode is in use.

We have now discovered that epoxy-sealed crystals, after subjection to differential temperature (the electrodes must be operable in a temperature range from 0°–100° C.), have a tendency to form microscopic fissures at the edge of the crystal due to thermal expansion. Any fissures, bubbles, or other interstices between the insulating sealant and the crystal edge result in sample entrapment and may, if extensive, result in transcrystal short circuits which adversely affect the operation of the electrode. The expansion coefficient of the plastics such as cast epoxy, typically 40 ($\times 10^{16}/°$ F.), is generally greater than that of typical crystals used for the ion-transfer membrane, for example, AgCl, 18.3; AgBr, 19.3; AgI, 2.2. The greater expansion of the epoxy resin and the outer plastic stem (polycarbonate, 25; fluorocarbon, 55) may cause an undesirable rupture at elevated temperature, say 80° C. This rupture produces the microscopic fissures referred to which serve as traps for minute quantities of the solution being measured. Upon transfer to a new solution, the occluded quantity of previous solution gradually diffuses out of the microfissures and is replaced by the new solution. While the transfer is taking place, the indicated electrode potential drifts because the potential developed at the crystal face is modified by that developed at the crystal edge. The indicated potential drifts to a stable new value as the new solution effectively replaces the old solution in the fissures at the crystal edge. This process may take as long as 20 minutes, and 5 to 10 minutes is common. Obviously such delays impair the utility of the electrode.

An ion-selective electrode may be typically used to measure ion activity in samples whose concentration ranges from greater than 1 molar (1 M) to less than $10^{16}$M. A perfect electrode, on being taken from a solution of one concentration and placed in a solution of a different concentration, will respond to the new solution activity by an almost instantaneous change of potential at the solution-crystal interface. Within a few second period of the first indication on the millivolt meter, the new potential reading will become stabilized. Any delay in stabilization is disadvantageous in a busy analytical laboratory where prompt results are required.

It is the object of the present invention to provide an ion-selective electrode incorporating an improved seal which may be repeatedly subjected to thermal stresses, for example, immersion in boiling water followed by immersion in ice water, without measurable increase of its typical five second stabilization time; and which is resistant to acid, alkaline, and other solutions to which is resistant to acid, alkaline, and other solutions to which such electrodes normally would be exposed. Because of the improved seal, the electrodes of the invention may be constructed with a solid (dry) rear surface or they may be of the solution-connected type, i.e. the connection between the conductor extending to the voltmeter and the crystal is made through an electrolyte solution. So far as we are aware, electrodes made heretofore, because of inferior insulating seals, will exhibit long equilibrium times after exposure to such extreme temperature variations.

Another object of this invention is to provide an improved ion-selective electrode membrane of any desired shape by compacting microsize particles of an ion transfer material in a mold and then sealing the interstices of the sample-contacting surface with a primer and elastomer of similar composition to the improved insulating sealant referred to above. For simplicity, this ion-selective compact will be also included in subsequent references to an "ion-transfer crystal" and, conversely, the term "membrane" will be understood to include any ion-transfer layer.

BRIEF DESCRIPTION OF THE INVENTION

The improved electrodes of the invention are prepared by sealing the ion-transfer crystal in the hollow end of the electrode stem or body by means of an elastomeric sealant which adheres tenaciously to the periphery of the crystal in spite of severe contraction and expansion. The preferred elastomer is a commercially available room temperature vulcanizing silicone rubber and in a preferred mode of the invention the periphery of the crystal is treated with a silicone primer to further enhance the bond at the crystal-sealant interface. Thus, when the assembly is subjected to tensile stresses that exceed the resilience of the silicone elastomer, rupture will occur between the sealant and the electrode stem rather than between the sealant and the crystal. Although our copending application Ser. No. 750,305 discloses room temperature vulcanizing silicone resins as sealants, that specification does not point out the necessity for eliminating the formation of microfissures in the sealant adjacent to the crystal. That disclosure cautions that the sealant should obviate leakage past the crystal, but does not teach that microfissures may form in the sealant which result in a source of trouble, that is, lack of immediate response to change of potential. The essence of the present invention is complete, fissure-free insulation of the crystal edge (or edges) by means of an insulating medium, the sealant, that yields in response to thermal expansion without admitting solution between the crystal and the sealant.

DESCRIPTION OF THE PREFERRED EMBODIMENT

Figure 1:
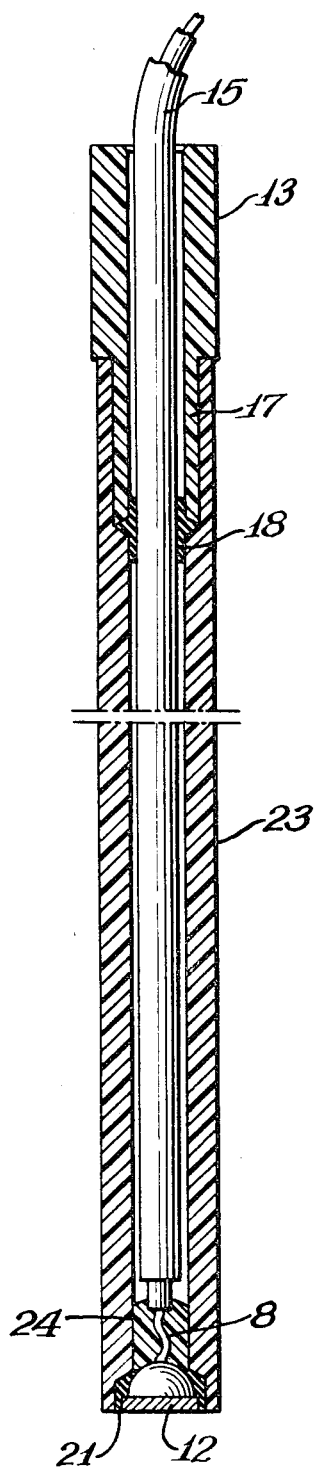
FIG. 1 is an enlarged cross-sectional view through an electrode having its ion-transfer crystal mounted in the stem in accordance with the teaching of this invention.

Referring to FIG. 1, the electrode has a cylindrical body 23 of penlike shape molded from plastic material such as polycarbonate resin or fluoro resin. The internal diameter of the lower end of the tubular body 23 may be slightly enlarged to receive the ion-transfer crystal 12. The rear face of the crystal 12 is connected to the wire 8 of the insulated cable 15 by means of a conductive solid material 4 as described in our aforementioned copending application. The annular space between the outer periphery of the crystal 12 and the inner surface of the stem or body 23 is filled with sealant material which mounts the crystal as described in more detail below. If a solid rigid connection is desired, the complete connection including the wire 8, the top of the crystal 12, the bonding mass 4, and the lower end of the insulation on the cable 15 may be potted in epoxy resin 24 and sealed to the inside of the stem 23.

The cable 15 is a conventional flexible single conductor shielded cable, the outer end of which connects to a millivolt meter. The upper end of the electrode is closed by a ferrule 13 which is inserted into the recess 17 and is bonded to the body by epoxy resin 18.

The sealant 21 is preferably room temperature vulcanizing silicone rubber which is resilient in nature and is capable of filling completely the annular space between the edge of the crystal the stem without fissures, voids, or bubbles. This annular space is preferably at least 0.010 inch wide. A lesser dimension provides less accommodation by the sealant to differential thermal expansion and lengthens the curing time of the sealant, where the sealant is one which cures by exposure to the air. To obtain an enhanced bond between the sealant 21 and the periphery of the crystal when using the silicone resin as the sealant, a silicone primer is first applied to the periphery of the crystal. In the event of unusual change in dimension which results in a rupture, the rupture will occur between the sealant and the inner surface of the stem rather than at the interface between the sealant and the crystal. Rupture at the former point does not result in the undesirable slow response.

Figure 2:
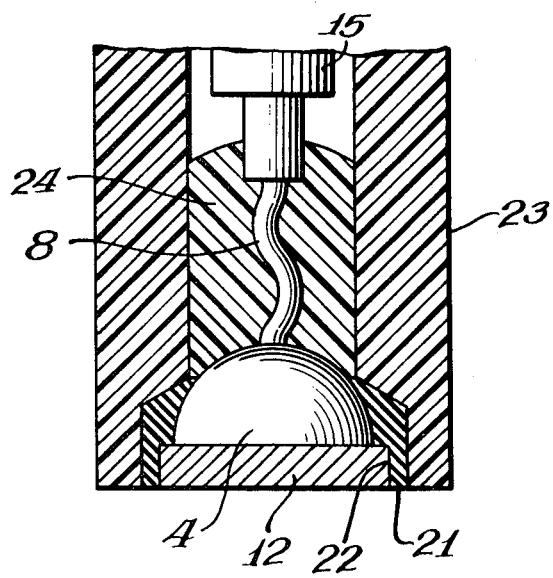
FIG. 2 is a greatly enlarged sectional view of the lower portion of the electrode shown in FIG. 1.

In assembling the electrode shown in FIGS. 1 and 2, the conductor 8 is bonded to the rear face of the crystal 12 as already described in our prior application. The edge of the crystal is then roughened slightly with 220 grit abrasive to mechanically promote adhesion. This edge is then washed with methanol and dried. The crystal is then dipped in silicone primer (15 –18 percent solids in acetone and isopropanol) compounded for use with room temperature vulcanizing silicone resin such as the hydrolyzing type primer No. 90–198 sold by Dow-Corning Company or SS–4004 sold by General Electric Company. These primers are commonly used for improving adhesion of room temperature vulcanizing silicone to rigid surfaces. The primer is not an effective insulator. The solvent used in the primer will evaporate so that it will dry in about one hour. For a rigid electrode construction not subjected to extreme temperature changes, the stem recess also may be treated by the primer in the same manner. The preferred sealant is a room temperature vulcanizing silicone rubber of the kind that cures by exposure to atmospheric moisture with the evolution of alcohol. Such a material is sold as Dow-Corning No. 3145 adhesive sealant. Other varieties of silicone rubber vulcanize at room temperature by reaction with acetic acid and air and these can also be used with acceptable results. If it is desired to adjust the curing time, two part silicones may be used, i.e. a separate catalyst like a metallic soap may be added to the resin in the required quantity. The rubbery material is applied with care to the back of the crystal over the primer and then to the edge of the crystal avoiding formation of bubbles or voids. Some of the sealant is also applied sparingly to the surface of the recess in the plastic stem after the cable has been threaded through the stem. The crystal is pressed home without delay into the recess. Excess sealant is carefully wiped off the assembly. Visual inspection is made for freedom from defects over the period of an hour. Then the electrode is allowed to cure for about five days to ensure a complete cure despite the small clearance between the crystal and the stem.

Electrodes made in this manner show stabilization after exposure to a new sample concentration within five seconds. If there are microfissures in the seal which show slow stabilization, they may be eliminated by coating the "glue line" with additional sealant and wiping the sealant over the face of the electrode to fill any crevices in the seal. After wiping the crystal face clean, the electrode may be tested immediately for speed of stabilization.

If mechanical considerations dictate, a more rigid seal can be effected by initially cementing the crystal with epoxy resin or other preferred rigid resin instead of the rubbery room temperature vulcanizing silicone. This seal, if thermally stressed, may microfissure as previously explained leading to slow electrode response. Furthermore, some of the epoxy resins absorb moisture in sufficient quantities to simulate the effects of a microfissure by degradation of the resistivity of the epoxy. In accordance with our new invention, such defects may be remedied by coating the "glue line" of the seal with silicone primer and then, after the primer is dry, with room temperature vulcanizing silicone rubber in the manner prescribed above. Thus, the objective of our invention is achieved, namely, to maintain a 100 percent nonporous resilient bond at the crystal edge so that the crystal remains fully insulated at all times. Room temperature vulcanizing silicone has a relatively high expansion coefficient, typically around 250 ($\times 10^{6\circ}$ F.). This coefficient is so much larger than the coefficients of thermal expansion for the crystal and the plastic stem that at elevated temperature, the sealant is compressed within the annular space between the crystal and stem.

Figure 3:
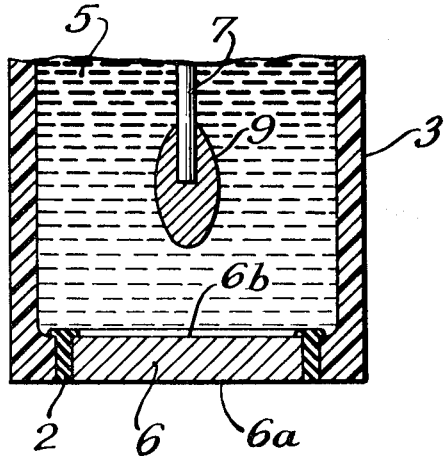
FIG. 3 is a greatly enlarged sectional view through a solution-connected electrode having a compacted membrane made and mounted in accordance with this invention.

Referring to FIG. 3, we have shown a modified form of our invention in which the electrical connection between the rear face of the crystal 6 connects to the conductor 7 through the electrolyte solution 5 and the mass of silver chloride 9. In this construction, the crystal is mounted within the end of the tubular body 3 by means of a sealant 2, preferably a room temperature vulcanizing silicone rubber. In this form, the crystal 6 may be a unitary membrane like the crystal 12, or alternatively it may be prepared by compacting a mass of minute crystals into the desired shape in a mold under pressure, in the same manner as powdered metal compacts are made. This structure is dense enough to give conductive ion transfer bridges from one crystallite to another but will, in general, be structurally weak. If intercrystal adhesion is not enough to give the compact adequate cohesive strength, a binder such as epoxy or other cementing agent is infiltrated sparingly into the crystalline structure as, for instance, by drawing out the entrained air by vacuum and allowing a measured small quantity of the binder to flow in to replace the air. A crystal membrane thus prepared is still subject to the same type of breakdown previously mentioned with respect to rigid seals because where the single crystal had one edge at which to fail, the polycrystalline mass has many. This condition may, however, be rectified by coating the surface of the membrane which is to interface with the liquid sample or electrolyte with the previously described silicone primer. After the primer is dry, the porous primed surface is filled with room temperature vulcanizing rubber using vacuum if required and the excess wiped off, thus sealing any surface fissures in accordance with the teaching of our invention. The polycrystalline membrane so constructed will show rapid, Nernstian response through direct contact from microcrystal to microcrystal, yet the sealant film prevents microcracks around each crystal. In effect this construction constitutes an aggregate of individually sealed crystals in parallel.

Figure 4:
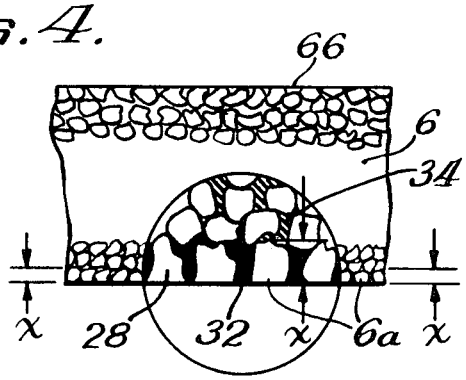
FIG. 4 is a greatly enlarged sectional view of a segment of the microsize particulate membrane 6 of FIG. 3.

FIG. 4 shows an enlarged view of a section of such a membrane. Here the compacted particles are designated by 28 and may, if necessary, be secured into a rigid mass by binder 34 which may be epoxy, polyester or other suitable cementing agent. Since only the sample face 6a of the membrane need be insulated, the binder 34 may also be a conductive epoxy similar to 4, FIG. 1, but in this case it must not encroach into the surface layer of particles or transcrystal shorts may result. The porosity of the sample contacting surface layer is sealed in accordance with our invention by filling the spaces between particles 28 with room temperature vulcanizing silicone rubber 32 after coating the particles with primer as heretofore described. With materials such as the glass particles presently to be described, the adhesion of the silicone rubber is greater and the primer may be omitted without departing from the spirit of our invention.

It may be seen by reference to FIG. 4 that the silicone sealed surface extends into the body of the membrane only a short distance indicated diagrammatically by the dimension X, X typically one or two layers of particles. We prefer not to extend this seal through the membrane because the membrane would then not be fully rigid and might develop microphonic variations of resistance between particles. In the membrane as described, however, the function of the remainder of the membrane other than the surface layer designated by X,X is simply a support function.

Figure 5:
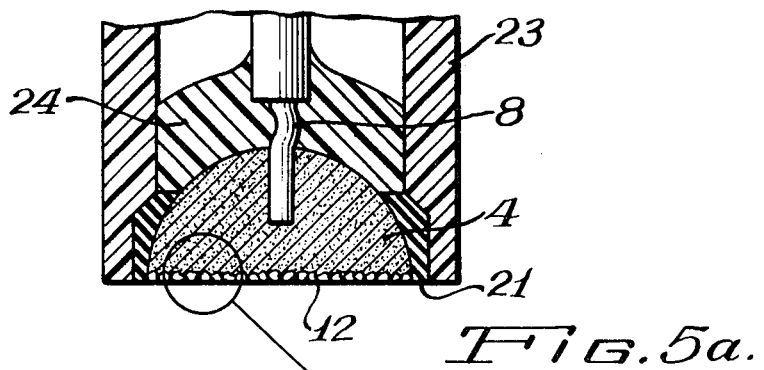
FIG. 5 is an enlarged sectional view through the membrane end of an electrode in which a compacted, microparticle membrane is connected to the conductor by a solid bond.
Figure 5A:
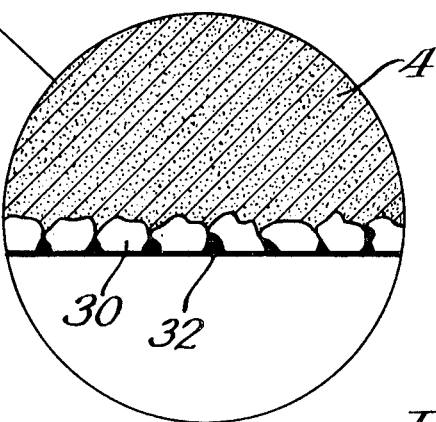
FIG. 5a is an enlarged section of a portion of membrane 12 of FIG. 5.

With the above in mind, we have carried our invention a step further in the case of our solid-connected electrode by letting the solid connection carry the support function and limiting the membrane to the thickness X, X An exemplary embodiment of this structure is shown in FIG. 5. In this, as in FIG. 1, the conductive epoxy bonded connection 4 is attached to conductor 8. To the face of this connection is adhered a thin layer of ion-transport material 30 which may be in the form of a single layer of particles. The spaces between particles 30 are sealed with silicone rubber 32 in accordance with our teaching as previously outlined. Thus the sensitive membrane is the layer 30 supported by our solid connection which now serves a dual function of support and connection.

To exemplify the fabrication of the above novel construction, we will describe its embodiment as a glass electrode for pH (hydrogen ion) or sodium ion measurement. Prior art glass electrodes have their membrane in the form of a blown bulb from 3 to 8 mm. diameter and typically 0.1 to 0.2 mm. thick made of any of the glass formulations known to the art as being sensitive to the subject ion. Such a bulb is at best fragile. Connection to the distal surface of the bulbous membrane is typically by means of a liquid connection similar to that shown in FIG. 3, where the bulb substitutes for membrane 6 sealed into stem 3. The preparation and sealing of such bulb-type electrodes is a critical and expensive process. Our novel construction, while suited to any type of ion-selective electrode as previously described, is most effective when applied to the making of a simple, inexpensive relatively unbreakable solid connected glass electrode.

The steps in fabrication may be briefly set forth as follows:
1. Glass of the desired formulation is crushed into particles or flakes having a typical thickness of 125 to 250 micrometers. The fines and large pieces should be removed.

2. (a) A thin layer of these particles, after cleaning with acetone, is spread on a flat surface either as a slurry or in the dry state. This layer must be as even and densely packed as possible for reasons to be discussed later. The solid connection is then made by placing the conductive epoxy 4 (described in our previously cited copending application) on the layer of particles and inserting the conductor 8.

(b) An alternative procedure is to prepare the conductive bond 4 with face 12 up and spread the particle layer evenly on this upturned face.

3. After cure of the conductive epoxy 4 the excess, unbonded glass particles are removed by shaking and light brushing leaving a single layer of particles on surface 12.

4. The surface is then sealed by applying silicone sealant rubber using a vacuum if necessary to withdraw air from the particle interstices. Silicone primer may be omitted in view of the good adhesion between silicone rubber and glass. We have found the following resistance relations for this construction:

resistivity of electrode glass = $10^{11}$ to $10^{12}$ ohm cm. depending on temperature and type of glass;

resistivity of room temperature silicone rubber = $5 \times 10^{14}$ ohm cm.

The glass area exposed will run from 40 to 75 percent of the surface area of the membrane. On the other hand the thickness of the silicone will be about half that of the glass particles on the average but this will be more than overcome by the generally tapering configuration of the silicone sealant sections. An estimate of the ration between resistance of the silicone seal and that of the glass layer in shunt therewith will give a range of from 500 to 10,000 as typical at room temperature, increasing with rise in temperature. The corresponding error in the slope of the electrode's calibration curve will be less than 0.2 percent decreasing with temperature rise and with increase of ratio of glass to silicone exposure.

5. After a complete cure of the silicone, the surface of the glass should be freed of excess silicone by sanding flat using a fine abrasive. Any leakers on the subsequent test may be repaired by wiping on fresh silicone, wiping off the excess and recuring as already described for circumferential membrane seals. This procedure may follow sealing the membrane into the stem.

It is apparent that the above process is extremely flexible being unlimited as to material or configuration of the resulting ion-selective electrode. It will also be apparent to one skilled in the art that by judicious selection of the material, which may be a selected, proportioned mixture, special responsivity to one or more than one selected ions may be achieved in a manner impossible to prior art electrodes.

Although the preferred sealant material is room temperature vulcanizing silicone rubber, other water-impermeable elastomeric materials which are resistant to the electrolyte solutions may be used. For example, a rubbery polyester prepared by condensing a polyhydric alcohol with a dibasic acid may be polymerized or cured from the semisolid to the solid state in the presence of benzoyl peroxide. Synthetic elastomers such as the condensation product of butadiene and acrylonitrile may be compounded with room temperature curing agents and tackifiers to produce the properties desired for use as a sealant in this invention.

From the foregoing it will appear that we have provided a greatly improved ion-selective electrode by maintaining an unbroken seal without fissures, bubbles, or other interstices between the insulating sealant and the crystal edge. We have found that voids, fissures or even an actual rupture between the sealant and the stem will not affect equilibration time unless an actual transcrystal short develops. For this reason, where the electrode is to be subject to an extreme range of temperatures, it is desirable to utilize a weaker bond between the sealant and the stem so that if rupture does occur, it will be at this interface rather than between the crystal and the sealant.

We claim:
1. An ion-selective electrode membrane comprising
   a porous rigid compact of microsize ion-transfer crystals having a face for contacting a liquid test sample
   binding means adhering said crystals together and
   an elastomeric water-impervious sealant filling the spaces between each of the crystals constituting said face of the compact.

2. The ion-selective electrode membrane of claim 1 wherein said sealant is a room temperature vulcanizing silicone rubber.

3. The ion-selective electrode membrane of claim 2 where said binding means comprises intercrystal adhesion effected by high pressure during formation of said compact.

4. An ion-selective electrode characterized by rapid response to a change in potential over a wide temperature range comprising
   a tubular stem molded from insulating plastic having a recess in the lower end thereof
   an ion-transfer membrane mounted within said recess and bonded thereto by an annular sealant strip of silicone rubber free of fissures
   said membrane comprising compacted microsize ion sensitive particles bonded together by a rigid resin and having an elastomeric sealant filling the spaces between each of the particles in the liquid-contacting face of the membrane,
   said sealant strip being adhered to the periphery of said membrane in liquid-impermeable relationship, and
   an electrical conductor connected to the inner face of said membrane and extending through the upper end of said tubular stem.

5. An ion-selective electrode characterized by rapid response to a change in potential over a wide temperature range comprising an ion-transfer membrane mounted in the end of a hollow nonconducting electrode body and an insulating seal made from vulcanized silicone rubber binding the periphery of said membrane to said body, said seal completely filling the space between said membrane periphery and said body and being free of discontinuities or gaps at the interface with said membrane, the bond between the membrane and the seal being stronger than the bond between the seal and the body.

6. The ion-selective electrode of claim 5 in which said membrane periphery is coated with a silicone rubber primer.